(12) United States Patent
Kreuzthaler

(10) Patent No.: US 11,318,800 B1
(45) Date of Patent: May 3, 2022

(54) PRESSURIZABLE ADAPTER OF BICYCLE VALVE

(71) Applicant: Klemens Kreuzthaler, St. Peter am Kammersberg (AT)

(72) Inventor: Klemens Kreuzthaler, St. Peter am Kammersberg (AT)

( * ) Notice: Subject to any disclaimer, the term of this patent is extended or adjusted under 35 U.S.C. 154(b) by 0 days.

(21) Appl. No.: 17/146,617

(22) Filed: Jan. 12, 2021

(51) Int. Cl.
*B60C 29/06* (2006.01)
*F16K 15/20* (2006.01)

(52) U.S. Cl.
CPC ............ *B60C 29/06* (2013.01); *F16K 15/207* (2013.01); *F16K 15/20* (2013.01); *Y10T 137/3584* (2015.04); *Y10T 137/3724* (2015.04)

(58) Field of Classification Search
CPC ......... Y10T 137/3584; Y10T 137/3724; Y10T 137/3786
See application file for complete search history.

(56) References Cited

U.S. PATENT DOCUMENTS

| | | | | |
|---|---|---|---|---|
| 1,865,231 A * | 6/1932 | Buck | .................. | F16K 15/20 137/223 |
| 2,178,828 A * | 11/1939 | Broecker | ................ | B60C 29/06 137/233 |
| 2,508,503 A * | 5/1950 | Doepke | .................. | B60C 29/00 152/415 |
| 2,812,000 A * | 11/1957 | Trinca | ..................... | B60C 29/06 152/427 |
| 3,315,695 A * | 4/1967 | Boyer | ..................... | F16K 15/20 137/232 |
| 4,445,527 A * | 5/1984 | Leimbach | ........... | B60C 23/0496 137/115.17 |
| 5,816,284 A * | 10/1998 | Lin | ......................... | F16K 15/20 137/223 |
| 6,651,689 B1 * | 11/2003 | Stech | ...................... | F16K 15/20 137/223 |
| 2004/0261848 A1 * | 12/2004 | Kayukawa | .............. | F16K 15/20 137/234.5 |
| 2005/0000568 A1 * | 1/2005 | Nikolayev | .............. | F16L 37/23 137/231 |
| 2013/0068318 A1 * | 3/2013 | Kliskey | ..................... | B23P 6/00 137/315.01 |
| 2015/0165845 A1 * | 6/2015 | Poertner | ............... | B60C 29/005 137/231 |
| 2020/0011441 A1 * | 1/2020 | Emi | ........................ | B60C 29/06 |

\* cited by examiner

*Primary Examiner* — Robert K Arundale
(74) *Attorney, Agent, or Firm* — Karin L. Williams; Alan D. Kamrath; Mayer & Williams PC

(57) ABSTRACT

A pressurizable adapter of bicycle valve can be used for a tubeless bicycle tire and contains: a receiving tube, a valve core and a valve cap. The receiving tube includes an internal screw portion, an air outlet, a first connecting part, an air inlet, at least one sealing ring and a connecting section. The valve core used is a standardized valve core. The valve core is housed in the connecting section of the receiving tube, the second connecting section of the valve core is connected to the first end of the receiving tube, and the second connecting portion of the valve core is in contact with the first connecting portion of the receiving tube, so that a closing effect is achieved. The valve cap contains a third connecting portion configured to connect to the first connecting portion and covers the air inlet of the receiving tube.

4 Claims, 6 Drawing Sheets

PRESSURIZABLE ADAPTER OF BICYCLE VALVE

BACKGROUND OF THE INVENTION

Field of the Invention

The present invention concerns an improvement of the air flow rate for a tire valve normally mounted on a bicycle, particularly a pressurizable adapter for a Schrader and Presta valve for tubeless and tube tires.

Description of the Prior Art

A tire valve consists of a tube whose outside diameter is standardized. The mechanical part of the valve (valve core) is inserted into this tube. The given dimensions limit the flow of air when inflating the tire.

The tire valve is connected on a wheel rim having an internal orifice and an external orifice. The tire valve contains a receiving tube and an airtight element fixed on a distal end of the receiving tube. The receiving tube has a threaded portion, a diameter of the airtight element is greater than a diameter of the external orifice of the wheel rim. The receiving tube is inserted through the external orifice and the internal orifice in turns to screw with the threaded portion of the receiving tube by using a screw nut so that the airtight element abuts against an outer wall of the external orifice to close the external orifice, thus obtaining air tightness.

However, a tire valve of the tubeless tire can only endure limited pressure of the air. For example, when the tubeless tire is a high-pressure tire, the air cannot be inflated into the tubeless tire in a predetermined high pressure. Thus, the tire valve cannot be applied to the high-pressure tire and this reduces the driving safety of the bicycle.

The present invention has arisen to mitigate and/or obviate the afore-described disadvantages.

SUMMARY OF THE INVENTION

The primary objective of the present invention is to significantly increase the possible air flow rate.

To achieve above-mentioned objective, the mechanical part of the valve (valve core) is removed from a tire valve already mounted in the rim.

Then the pressurizable adapter of bicycle valve is screwed onto the thread located on the outside or inside of the tire valve tube, depending on the version.

Inside the pressurizable adapter of bicycle valve there is the mechanical part of a Schrader valve (valve core) which now takes over the function of the Presta valve.

The Schrader valve has a much larger diameter, which allows a larger amount of air to flow through at the same time as the Presta valve.

Also a receiving tube of the Presta valve can be used for maximum air flow because there is no longer a limiting Schrader valve core in the receiving tube.

The advantage of the present invention is that bicycle tires with a tire valve can be inflated faster with the maximum air flow, especially with large-volume tubeless bicycle tires, the tire bead is pressed more quickly against the rim and the system is thus sealed more quickly.

DETAILED DESCRIPTION OF THE PREFERRED EMBODIMENTS

The present invention becomes clearer from the following description when considered together with the accompanying drawings which, for illustrative purposes only, show a preferred embodiment in accordance with the present invention.

Figure 1:
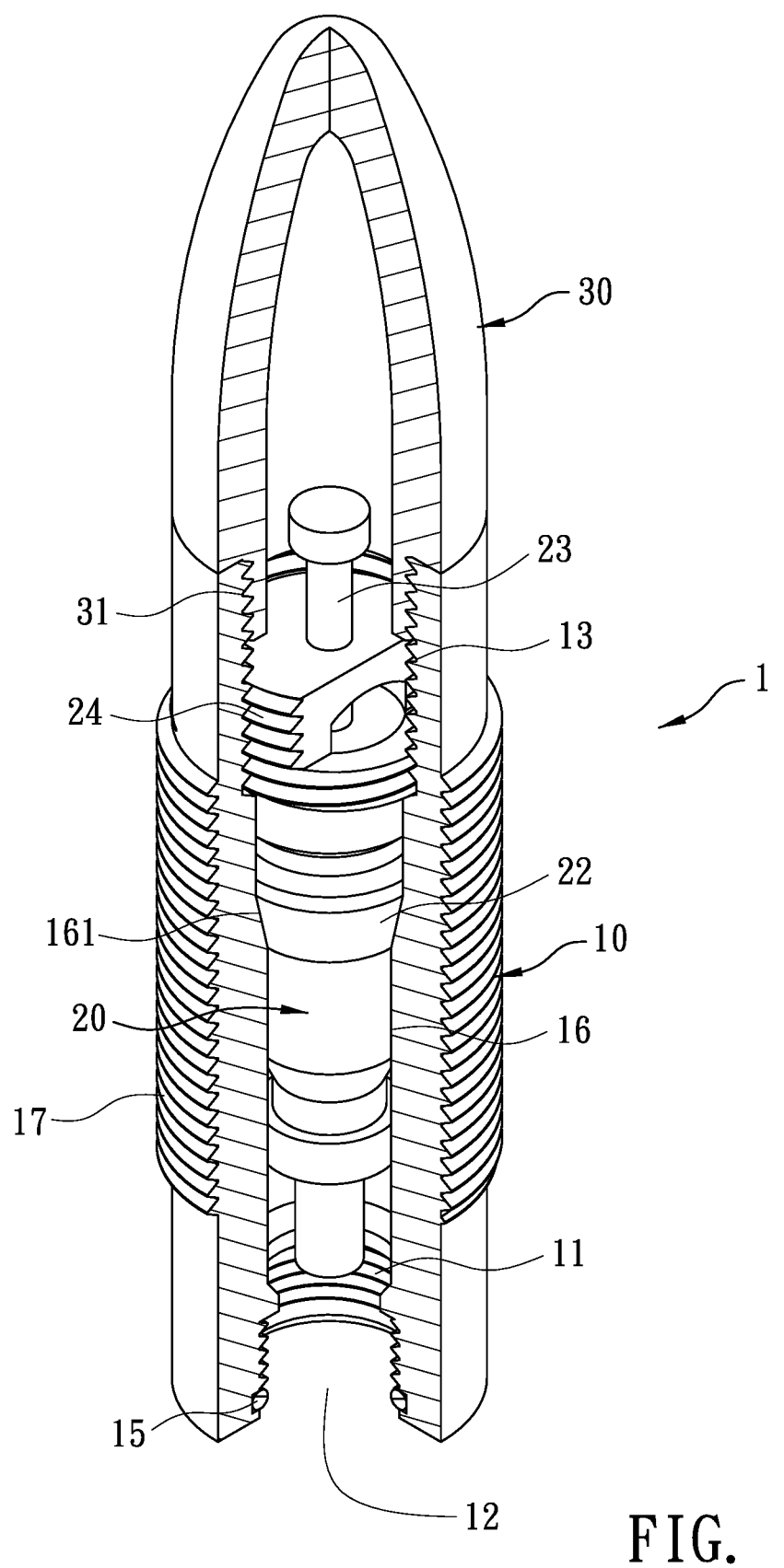
FIG. 1 is a cross-sectional perspective view showing the assembly of a pressurizable adapter according to a preferred embodiment of the present invention.
Figure 2:
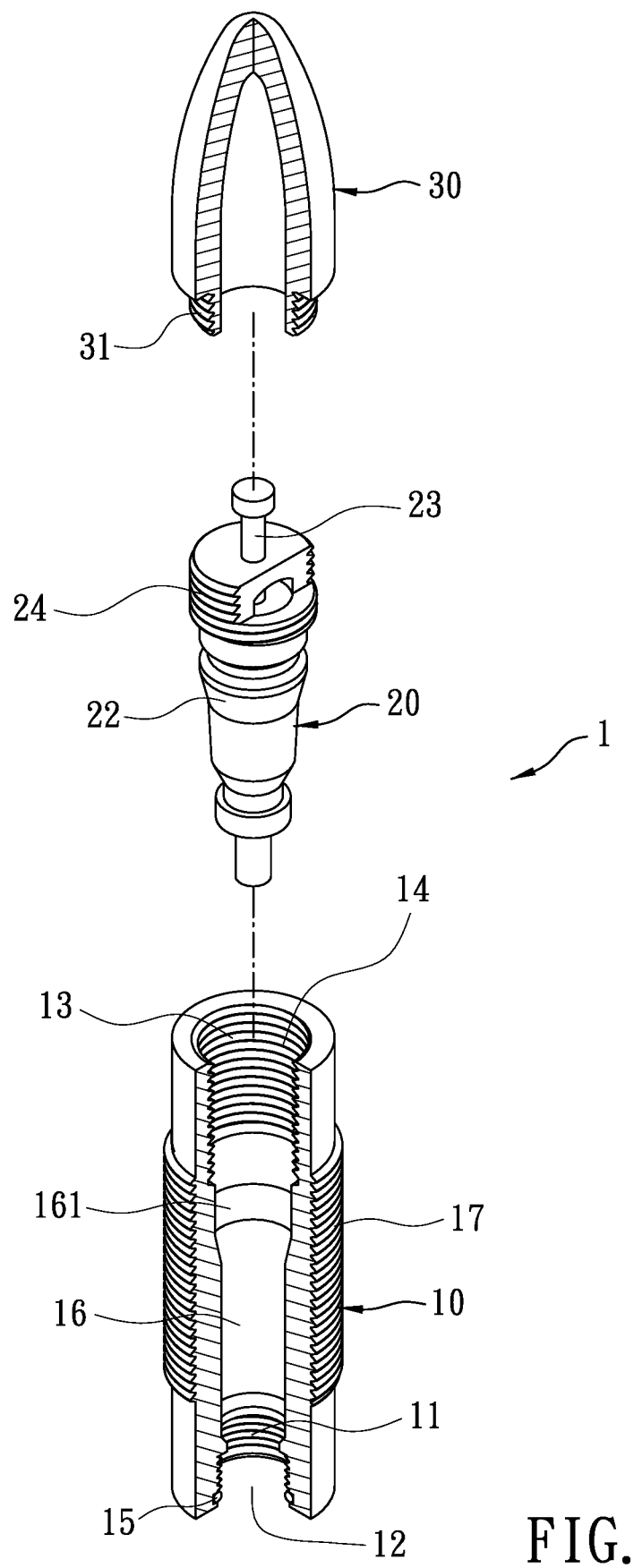
FIG. 2 is a cross-sectional perspective view showing the exploded components of the pressurizable adapter according to the preferred embodiment of the present invention.
Figure 3:
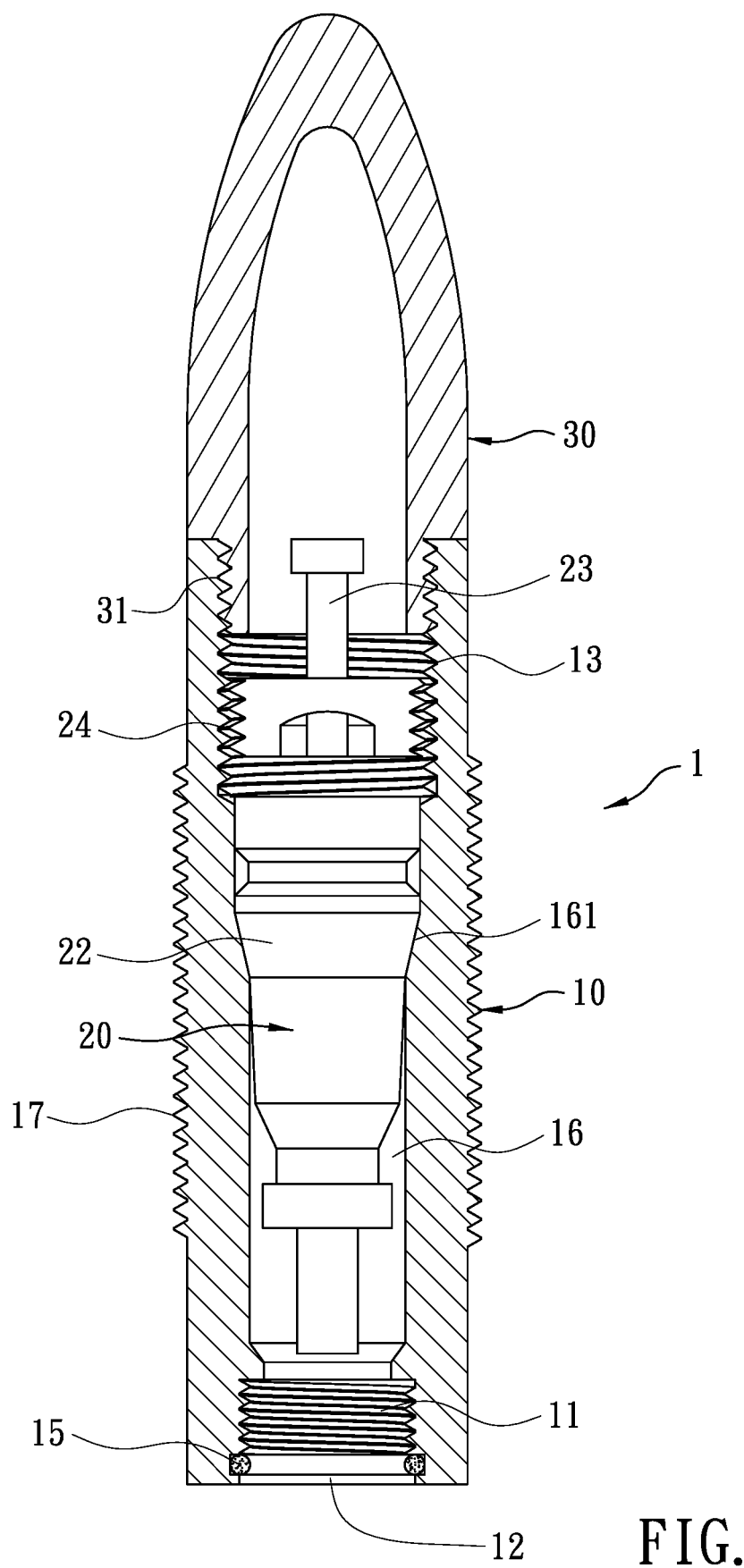
FIG. 3 is a cross-sectional view showing the assembly of the pressurizable adapter according to the preferred embodiment of the present invention.

With reference to FIGS. 1-3, an adapter 1 is applicable to a tubeless bicycle tire (not shown) according to a preferred embodiment of the present invention, and the adapter 1 consists of: a receiving tube 10, a valve core 20 and a valve cap 30.

The receiving tube 10 comprises an internal screw portion 11 and an air outlet 12 formed at a first end of the receiving tube 10, wherein the receiving tube 10 further has multiple V-grooves formed on an inner wall and an external thread on an outer wall thereof, a first connecting portion 13 and an air inlet 14 located at a second end of the receiving tube 10, the first connecting portion 13 being an internal thread, at least one sealing ring 15 fitted on the internal screw portion 11, and a connecting section 16 defined between and communicating with the air outlet 12 and the air inlet 14. The connecting section 16 (including the first connecting portion 13 and an abutting portion 161) is designed to fit a standardized valve core of a Schrader valve.

The receiving tube 10 also has a groove/roughening 17 on the outer wall.

The valve core 20 to be added is a standardized Schrader/Presta valve, thus provides the necessary closing action.

The valve core 20 includes a second connecting portion 24 formed on an end thereof, a sealing gasket 22 mounted on a middle section of an outer wall of the valve core 20, and a shaft 23 movably inserted through a center of the valve core 20, wherein the second connecting portion 24 is external threads, the valve core 20 is accommodated in the a connecting section 16 of the receiving tube 10, the second connecting portion 24 of the valve core 20 is connected with the first connecting portion 13 of the receiving tube 10, and the sealing gasket 22 of the valve core 20 abuts against the abutting portion 161 of a connecting section 16 of the receiving tube 10 so as to obtain a closing effect.

The valve cap 30 contains a third connecting section 31, which is a male thread connected to the first connecting section 13 of body 10, and the cover collar 30 covers the air inlet 14 of the receiving tube 10.

Figure 4:
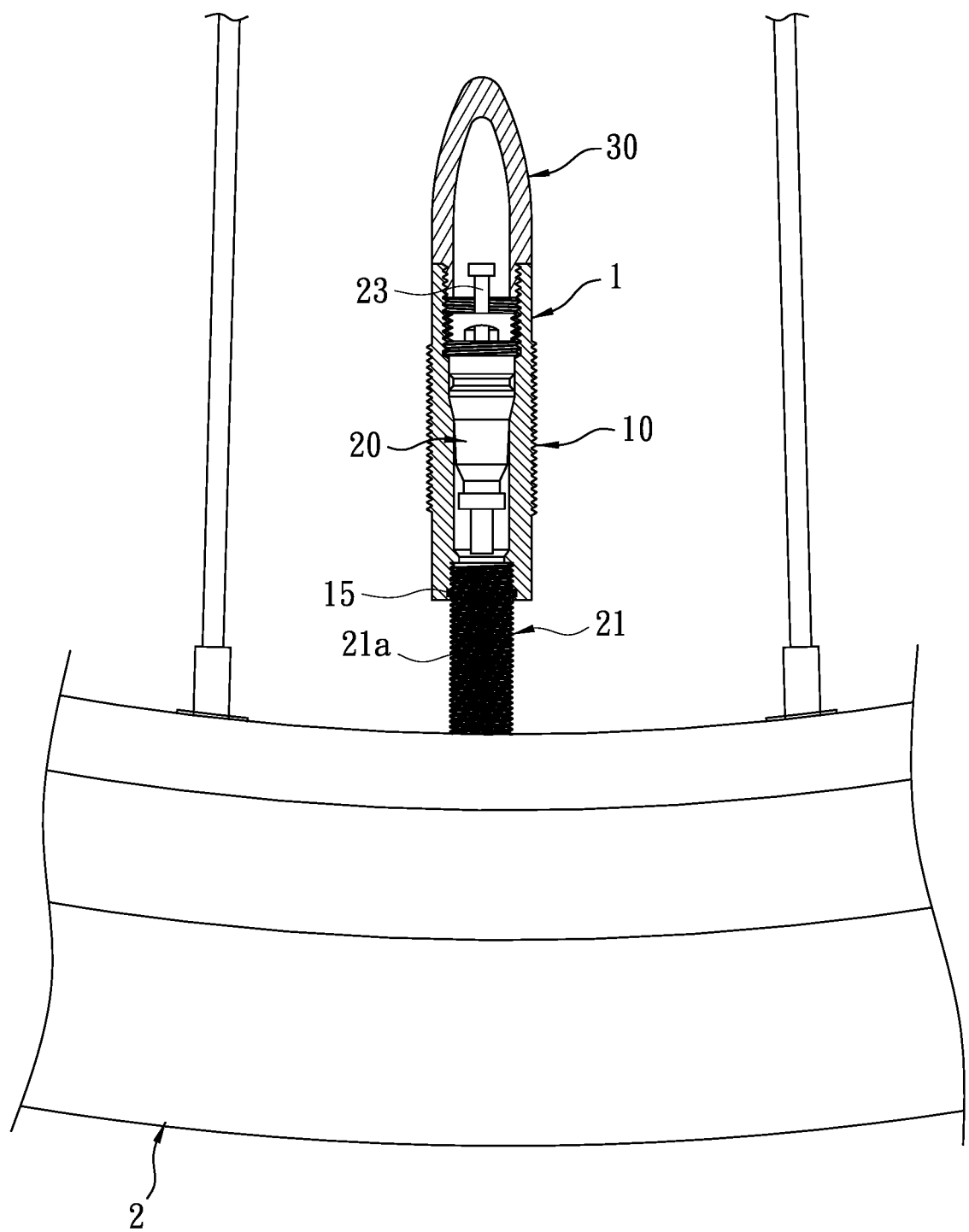
FIG. 4 is a cross-sectional view showing the operation of the pressurizable adapter according to the preferred embodiment of the present invention.

With reference to FIG. 4, in operation, the adapter 1 is connected to a Schrader valve 21 of a tubeless tire 2, wherein the Schrader valve 21 having a threaded portion 21a formed on an outer wall thereof, to be screwed to the internal screw section 11 of the receiving tube 10 of the adapter 1, and the sealing ring 15 of the receiving tube 10 closes the adapter 1 and the Schrader valve 21 of the tubeless tire 2.

Figure 5:
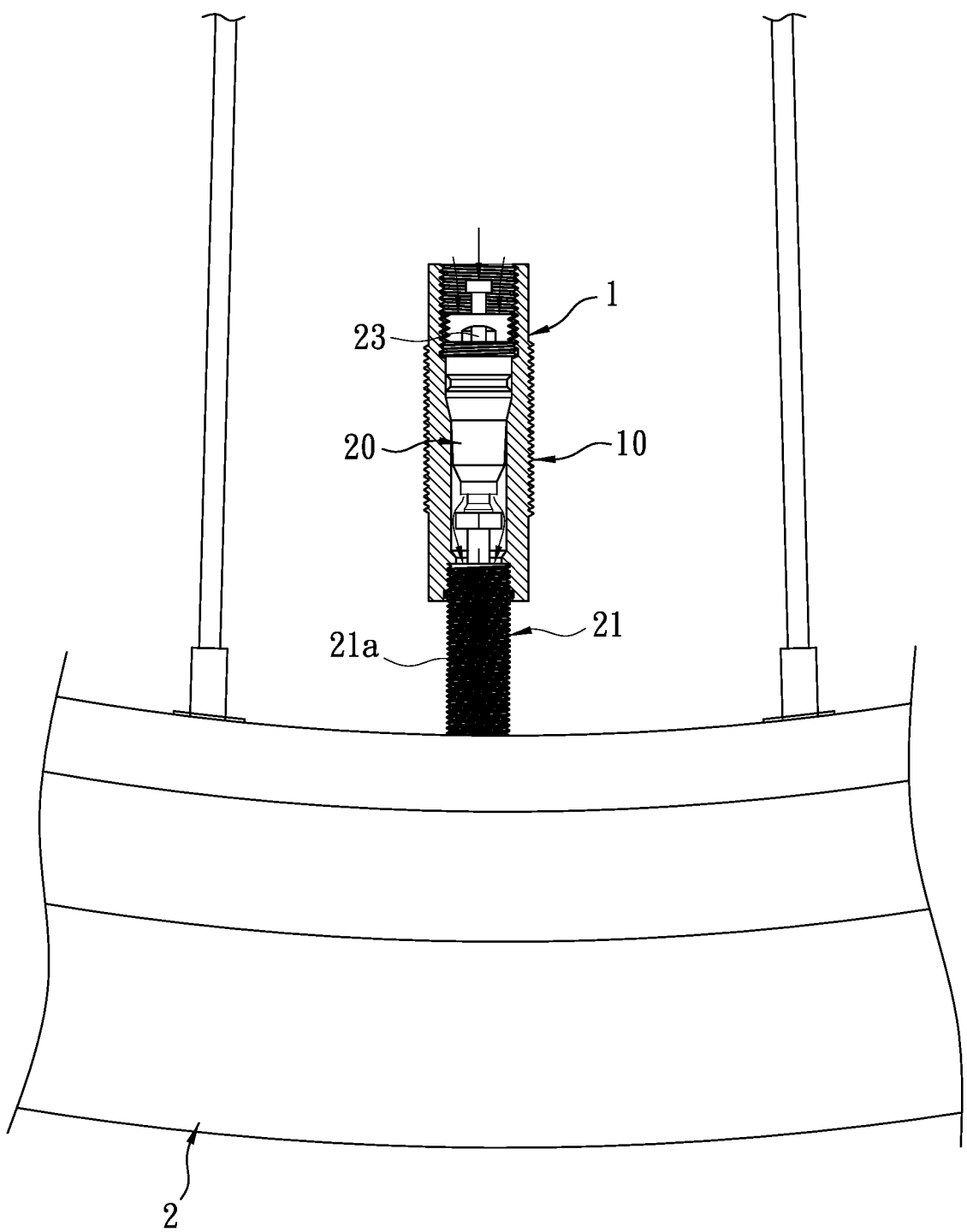
FIG. 5 is another cross-sectional view showing the operation of the pressurizable adapter according to the preferred embodiment of the present invention.

When inflating air into the tubeless tire 2, as shown in FIG. 5, the valve cap 30 is removed, so that the adapter 1 is connected to a bicycle pump (not shown).

Now the function of the previously removed Presta valve is replaced by the adapter 1.

Figure 6:
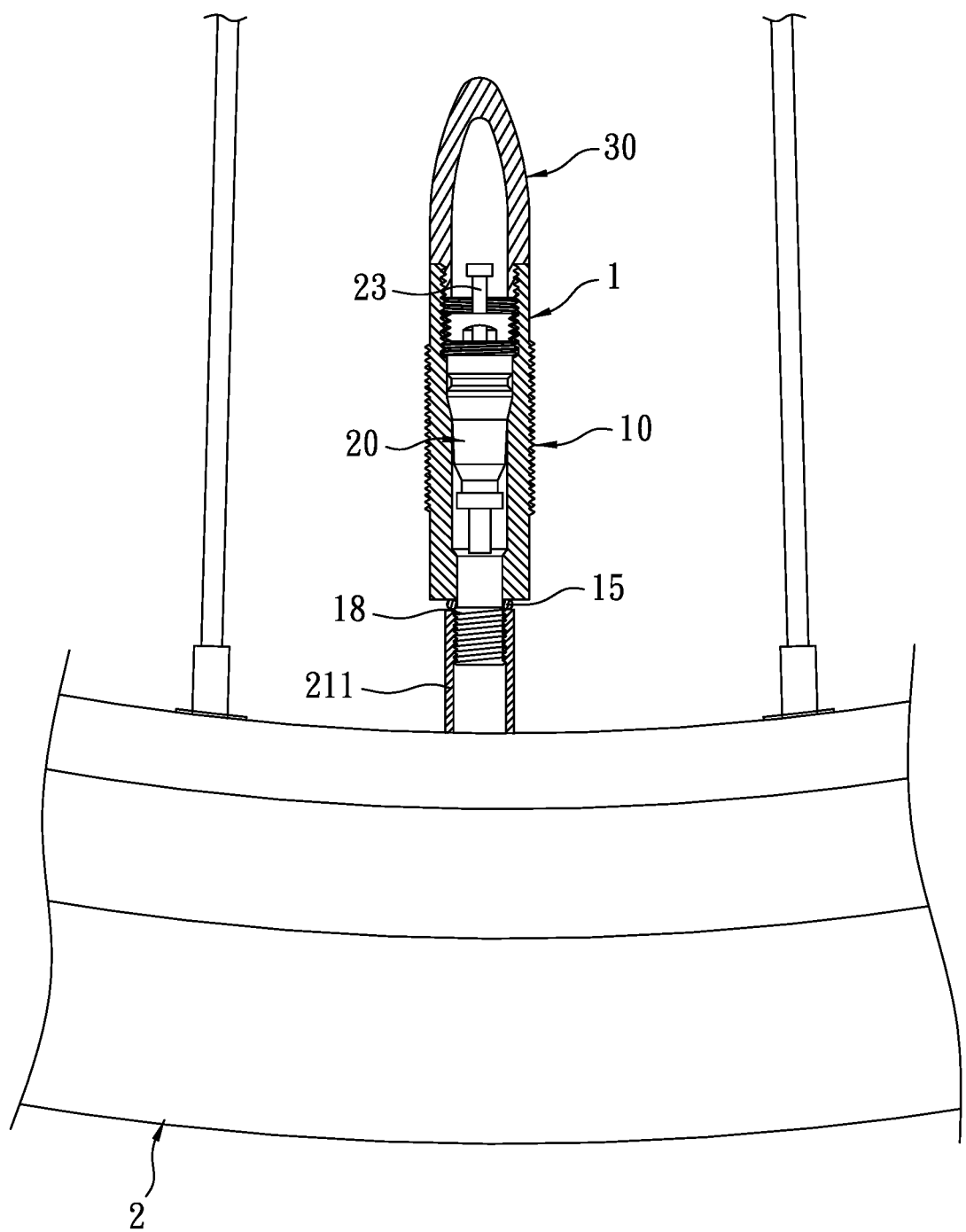
FIG. 6 is also another cross-sectional view showing the operation of the pressurizable adapter according to the preferred embodiment of the present invention.

Referring to FIG. 6, in another embodiment, an end of the receiving tube 10 is defined an outer thread portion 18 which is locked and secured to a Presta valve 211 of the tubeless tire 2. Thus, the outer thread portion 18 can be used with the Presta valve 211 of the tubeless tire 2 to achieve multipurpose utility.

The adapter 1 of the present invention has the following advantages:

the adapter 1 is connected to the tire valve of the tubeless tire 2 in order to tightly stop the air through the adapter 1, and the valve tube of the tubeless tire 2 to inflate the air into the tubeless tire 2 with greater amount of air by per unit of time, which means that the tire is inflated faster and, in the case of tubeless systems, the tire bead is pressed against the rim wall more quickly to seal the system.

While various embodiments have been shown and described in accordance with the present invention, it is clear to those skilled in the art that further modifications may be made without departing from the scope of the present invention.

What is claimed is:

1. A pressurizable adapter of a bicycle valve, adaptable to a tubeless bicycle tire having one of a Presta valve or a Schrader valve, comprising
    a receiving tube having an internal screw portion and an air outlet formed at a first end, a first connecting portion and an air inlet disposed at a second end of the receiving tube, at least one sealing ring fitted on the internal screw portion, and a connecting section defined between and communicating with the air outlet and the air inlet;
    the connecting section is formed such that a standardized valve core can be used to achieve a closing effect; and
    a valve cap having a third connecting portion configured to be connected to the first connecting portion of the receiving tube, and the valve cap covers the air inlet of the receiving tube,
    wherein the first connecting portion is an internal thread, a second connecting portion is an external thread and the third connecting portion is an external thread.

2. The pressurizable adapter of a bicycle valve as claimed in claim 1 wherein the connecting section of the receiving tube has an abutting portion defined on an inner wall thereof, and a sealing gasket of the inserted standardized valve core abuts against the abutting portion of the connecting section of the receiving tube.

3. The pressurizable adapter of a bicycle valve as claimed in claim 1, wherein the receiving tube has multiple V-grooves formed on an inner wall and an external thread on an outer wall thereof.

4. The pressurizable adapter of a bicycle valve as claimed in claim 1, wherein a valve core includes a second connecting portion formed on an end thereof, a sealing gasket mounted on a middle section of an outer wall of the valve core, and a shaft movably inserted through a center of the valve core, wherein the second connecting portion is external threads, the valve core is accommodated in the a connecting portion of the receiving tube, the second connecting portion of the valve core is connected with the first connecting portion of the receiving tube, and the sealing gasket of the valve core abuts against the abutting portion of a connecting portion of the receiving tube so as to obtain a closing effect.

\* \* \* \* \*